No. 745,691. PATENTED DEC. 1, 1903.
G. S. THOMPSON.
AUTOMATIC BELT GUIDE FOR THRESHING MACHINES.
APPLICATION FILED NOV. 25, 1902.
NO MODEL.
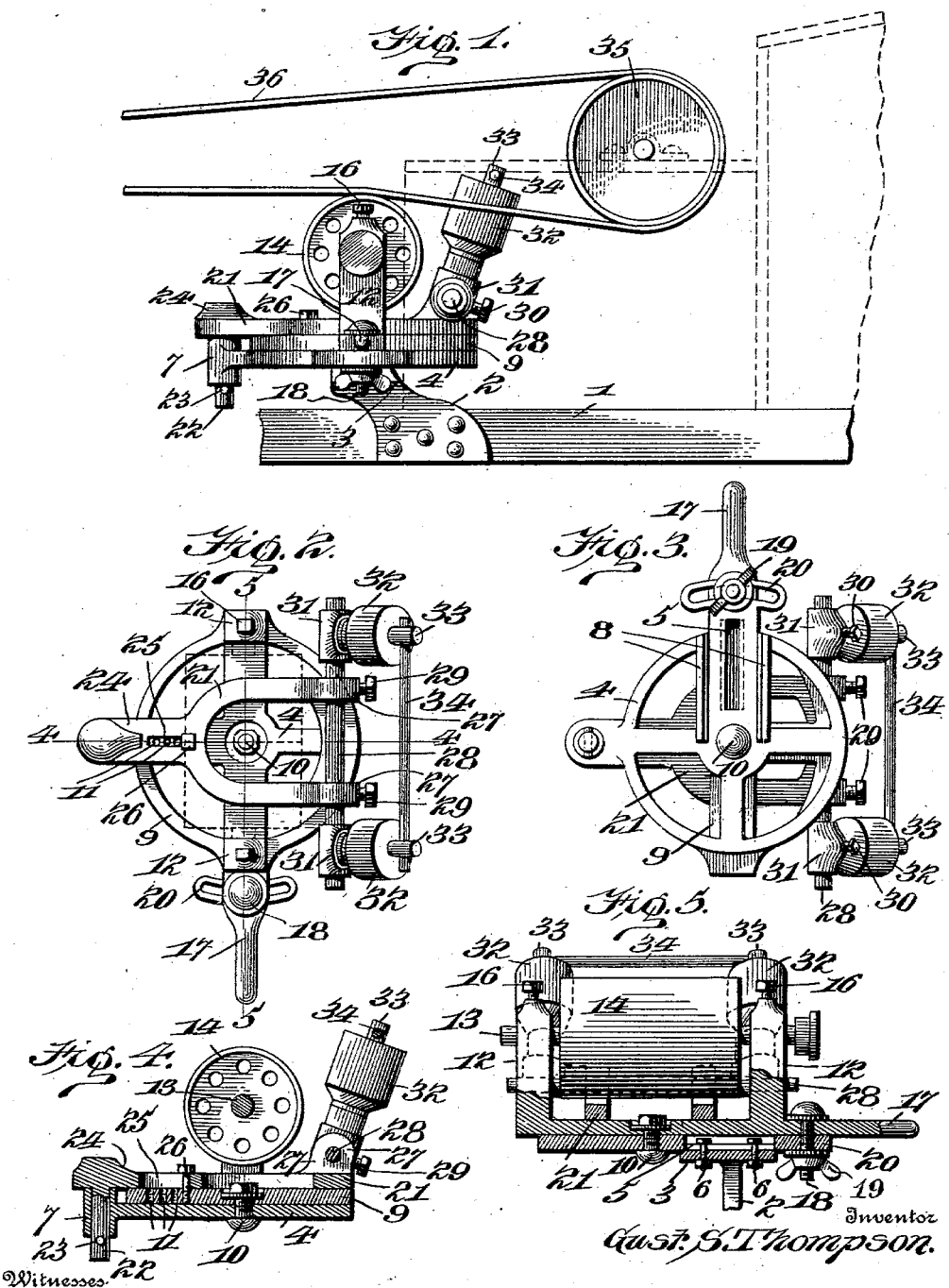

No. 745,691.

Patented December 1, 1903.

UNITED STATES PATENT OFFICE.

GUSTAVUS SYLVANUS THOMPSON, OF BALTIC, SOUTH DAKOTA.

AUTOMATIC BELT-GUIDE FOR THRESHING-MACHINES.

SPECIFICATION forming part of Letters Patent No. 745,691, dated December 1, 1903.

Application filed November 25, 1902. Serial No. 132,781. (No model.)

*To all whom it may concern:*

Be it known that I, GUSTAVUS SYLVANUS THOMPSON, a citizen of the United States, residing at Baltic, in the county of Minnehaha, State of South Dakota, have invented certain new and useful Improvements in Automatic Belt-Guides for Threshing-Machines, &c., of which the following is a full, clear, and exact specification.

The object of my invention is to provide a belt-guide which will obviate friction on the edges of the belt and to hold the belt in place against side winds; and with this and minor objects my invention consists of the parts and combinations of parts, as will be hereinafter more fully described.

In the accompanying drawings, Figure 1 is a side elevation of my invention, showing the belt in relative position thereto. Fig. 2 is a top plan view of the same, parts being removed. Fig. 3 is a bottom plan view of the same. Fig. 4 is a transverse section on the line 4 4, Fig. 2; and Fig. 5 is a front elevation of my invention, parts being in section.

1 represents a suitable support, upon which is secured a bracket or arm 2, having a crosshead 3, provided with suitable bolt-openings.

4 is a disk having a slot 5, in which bolts 6 are positioned, said bolts extending through openings in the head 3 of the bracket 2, whereby said disk is secured to said bracket. The object of the slot is to adapt said disk for adjustment from side to side for the purpose of bringing the superimposed belt-guide directly under the drive-belt. This disk is provided with an enlargement 7, having a cylindrical bore, to be hereinafter referred to. The disk 4 is provided with guideways 8 upon its under face, between which the head 3 of the standard 2 is guided.

9 is a skeleton disk pivotally mounted upon the disk 4 by means of a bolt 10, said disk being provided with bolt-openings 11, to be hereinafter referred to. 12 represents standards extending upwardly from the face of said disk 9, in the top of which is journaled a shaft 13, upon which belt-guide 14 is mounted, said shaft being held against displacement in the standards 12 by means of the set-screws 16.

17 is a handle extending from one side of the skeleton disk 9, which is provided with a bolt 18, having thumb-screw 19, said bolt adapted to slide within the arc-shaped elongated slot 20, formed integral with the disk 4, as shown in several figures, and held in the desired position by means of said bolt 18 and thumb-screw 19.

21 represents U-shaped arms provided with an extension 24, in which there is an elongated slot 25, said extension having at its forward end a depending pivot-pin 22, adapted to be journaled in the enlargement 7 of the disk 4 and retained therein by means of the pin 23.

26 is a bolt seated in the elongated slot 25 and adapted to have a threaded engagement with one of the series of bolt-openings 11 in the disk 9.

The outer ends of the arms 21 are provided with bosses or lugs 27, having openings therein, in which is secured a rod 28 by means of the set-screws 29. Upon the ends of the rod 28 are secured, by means of set-screws 30, journal-boxes 31, in which are journaled shifting-rollers 32 upon shafts 33.

34 is a rod extending between shafts 33.

35 represents the band-pulley of a suitable machine, upon which is secured the driving-belt 36.

The operation is as follows: The whole device is secured upon the head of the standard 2 and adjusted by means of the slot 5 until it is directly under the belt. When the engine and the machine to be driven are at an angle to each other, so that the belt is not in a straight alinement, the edge of the belt strikes upon one or other of the rollers 32, thereby through the shaft 28 revolving the forks or U-shaped arms 21 upon their pivot-pin 22, depending from the forward extension of the arms 21, thus through the pivot-bolt 26 shifting the disk 9 on its pivot 10 until the shaft 13, journaled in the standards 12 and carrying the pulley 14, is at an angle with belt sufficient to draw the same away from roller, which is struck by the belt. When the parts are in this position, they may be secured rigidly relatively to one another by means of the thumb-screw 19, as shown in Fig. 5.

The rollers 32 may be shifted, with their bearings, on the shaft 13 and rigidly secured in the desired position by means of the set-screws 30. As stated, the rollers 32 are for the purpose of switching the disk carrying the belt-pulley 14 until the edge of the belt is clear of said rollers, thus placing the friction that is necessary in holding the belt straight on the cylinder-pulley 35 when the engine is out of alinement with the machine to be operated or when there is a side wind on the flattened side of the belt.

Having thus described the invention, the following is what is claimed as new therein:

1. In an automatic belt-guide, the combination with an adjustable support, of means connecting the belt-guide adjustably upon said support.

2. In an automatic belt-guide, the combination with an adjustable support, of a disk, a belt-pulley mounted on said disk, a movable member mounted upon said disk, and means rigidly connected to said member, constructed to be operated by a belt to aline the said pulley with the belt.

3. In an automatic belt-guide, the combination with an adjustable support, of a base adjustably secured thereto, a belt-pulley pivotally mounted upon said base, and means, connected to said base, carrying friction-rollers adapted to be operated by the belt to shift the belt-pulley.

4. In an automatic belt-guide, the combination with the support, a base and a belt-pulley, adjustably secured on said base, of a disk pivotally mounted on said base, forked-shaped arms pivotally secured to said base and extending above said disk, a shaft connecting said forked arms, and friction-rollers adjustably secured on said shaft, said rollers being constructed for engagement with the belt, whereby the belt-pulley is given the necessary angle to draw the belt away from said rollers.

The foregoing specification signed this 22d day of September, 1902.

GUSTAVUS SYLVANUS THOMPSON.

In presence of—
P. J. ROGDE,
EDNA DIXSON.